(12) United States Patent
Rusher et al.

(10) Patent No.: US 8,262,148 B2
(45) Date of Patent: Sep. 11, 2012

(54) TONNEAU COVER SYSTEM

(75) Inventors: Ryan Rusher, Yankton, SD (US); Mike Spencer, Hubbard, NE (US)

(73) Assignee: Extang Corporation, Ann Arbor, MI (US)

( * ) Notice: Subject to any disclaimer, the term of this patent is extended or adjusted under 35 U.S.C. 154(b) by 272 days.

(21) Appl. No.: 12/609,203

(22) Filed: Oct. 30, 2009

(65) Prior Publication Data

US 2011/0101727 A1    May 5, 2011

(51) Int. Cl.
*B60R 9/06*    (2006.01)

(52) U.S. Cl. .......... 296/100.06; 296/100.08; 296/100.09

(58) Field of Classification Search ............. 296/100.02, 296/100.06, 100.07, 100.08, 100.09
See application file for complete search history.

(56) References Cited

U.S. PATENT DOCUMENTS

| | | | | |
|---|---|---|---|---|
| 4,861,092 A | * | 8/1989 | Bogard | 296/100.09 |
| 5,743,586 A | * | 4/1998 | Nett | 296/100.02 |
| 7,537,264 B2 | * | 5/2009 | Maimin et al. | 296/100.09 |

\* cited by examiner

*Primary Examiner* — Joseph Pape
(74) *Attorney, Agent, or Firm* — Harness, Dickey & Pierce, P.L.C.

(57) ABSTRACT

A tonneau system for a cargo box of a vehicle having at least one panel section having opposing edge members. The edge members each have a downwardly extending cam surface engagable with opposing sides of the cargo box of the vehicle to generally self-center the panel section between the opposing sides of the cargo box.

20 Claims, 8 Drawing Sheets

TONNEAU COVER SYSTEM

FIELD OF THE DISCLOSURE

The present disclosure generally relates to coverings for pickup trucks and, more particularly, relates to a tonneau cover system.

BACKGROUND OF THE DISCLOSURE

This section provides background information related to the present disclosure which is not necessarily prior art.

Tonneau covers have been used for a number of years to cover the cargo box of pickup trucks against dirt, debris, and other environmental contaminants and to improve the aesthetic quality thereof. Current tonneau covers often employ a frame structure that is suspended above the cargo box of the pickup truck along a complex frame network. This frame network typically includes a series of support members that are fixedly coupled to the sidewalls of the cargo box, using complicated and numerous fastening devices, and require extensive installation effort. Once installed, many conventional tonneau systems require a substantial amount of time to remove and properly resecure in order to gain access to the cargo box of the pickup truck.

SUMMARY OF THE DISCLOSURE

This section provides a general summary of the disclosure, and is not a comprehensive disclosure of its full scope or all of its features.

According to the principles of the present teachings, a tonneau system for a cargo box of a vehicle is provided having at least one panel section having opposing edge members. The edge members each have a downwardly extending cam surface engagable with opposing sides of the cargo box of the vehicle to generally self-center the panel section between the opposing sides of the cargo box.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF THE EMBODIMENTS

Figure 1:
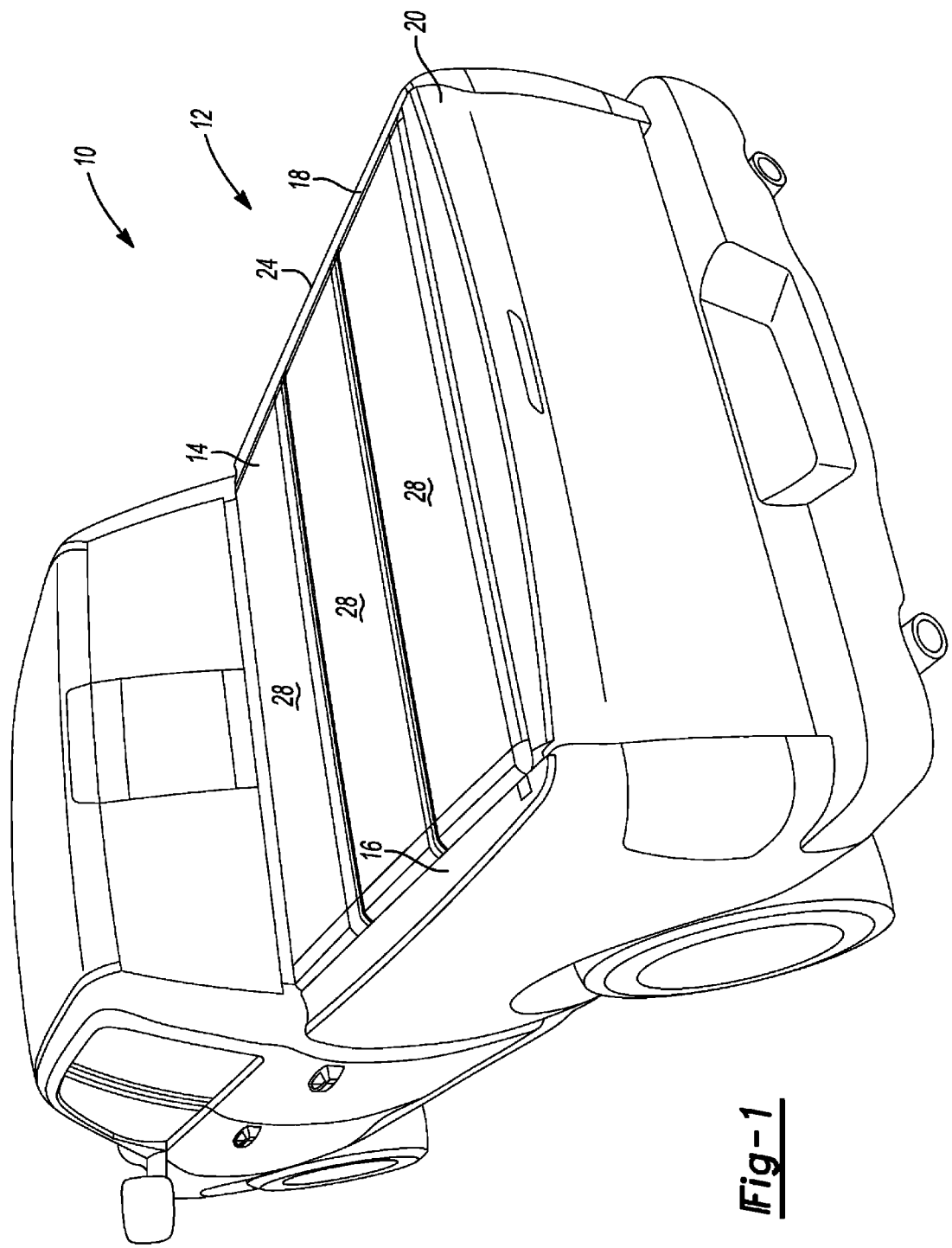
FIG. 1 is a perspective view illustrating a pickup truck having a tonneau cover system in an extended position according to the principles of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
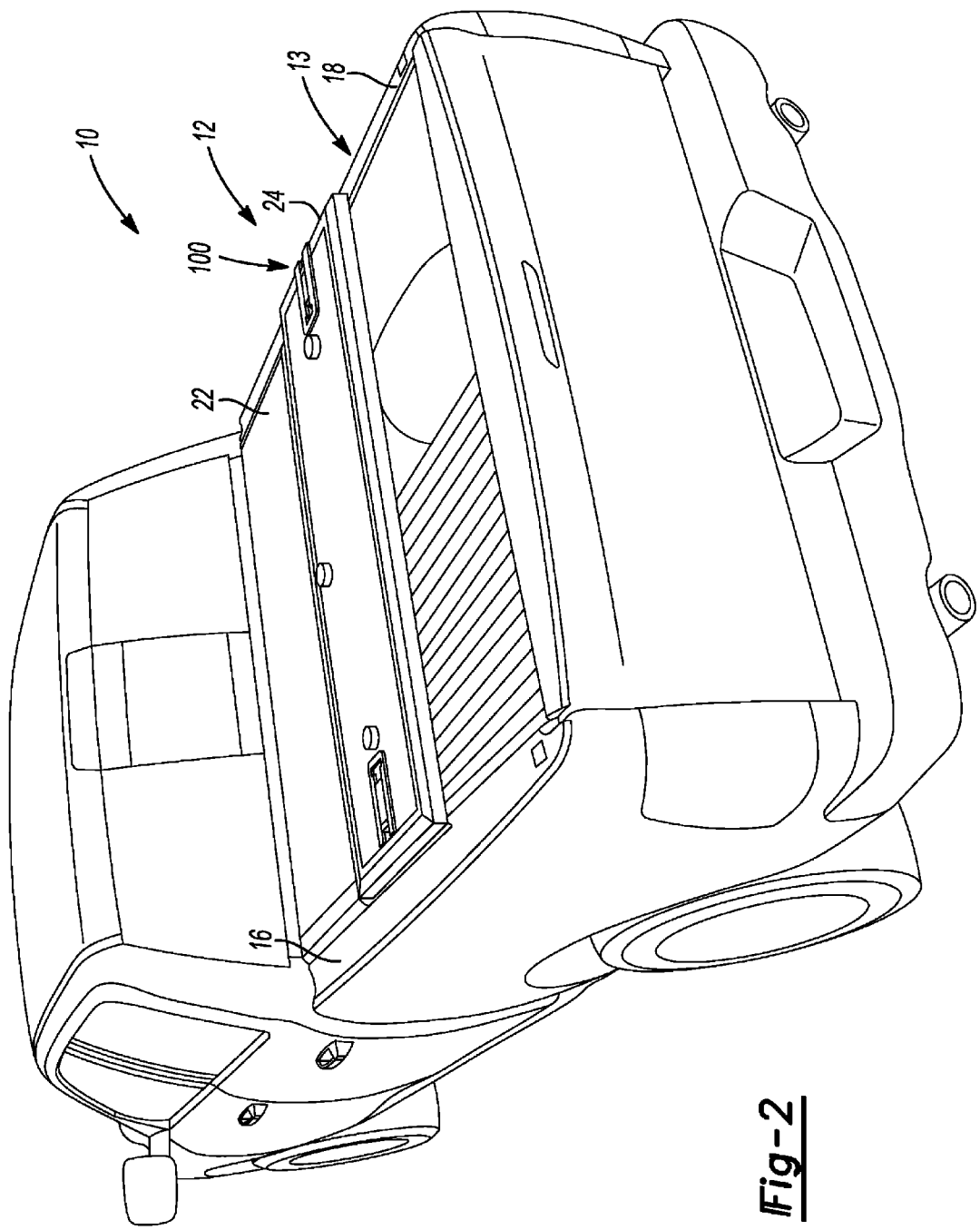
FIG. 2 is a perspective view illustrating a pickup truck having a tonneau cover system in a partially extended position according to the principles of the present disclosure.
Figure 3:
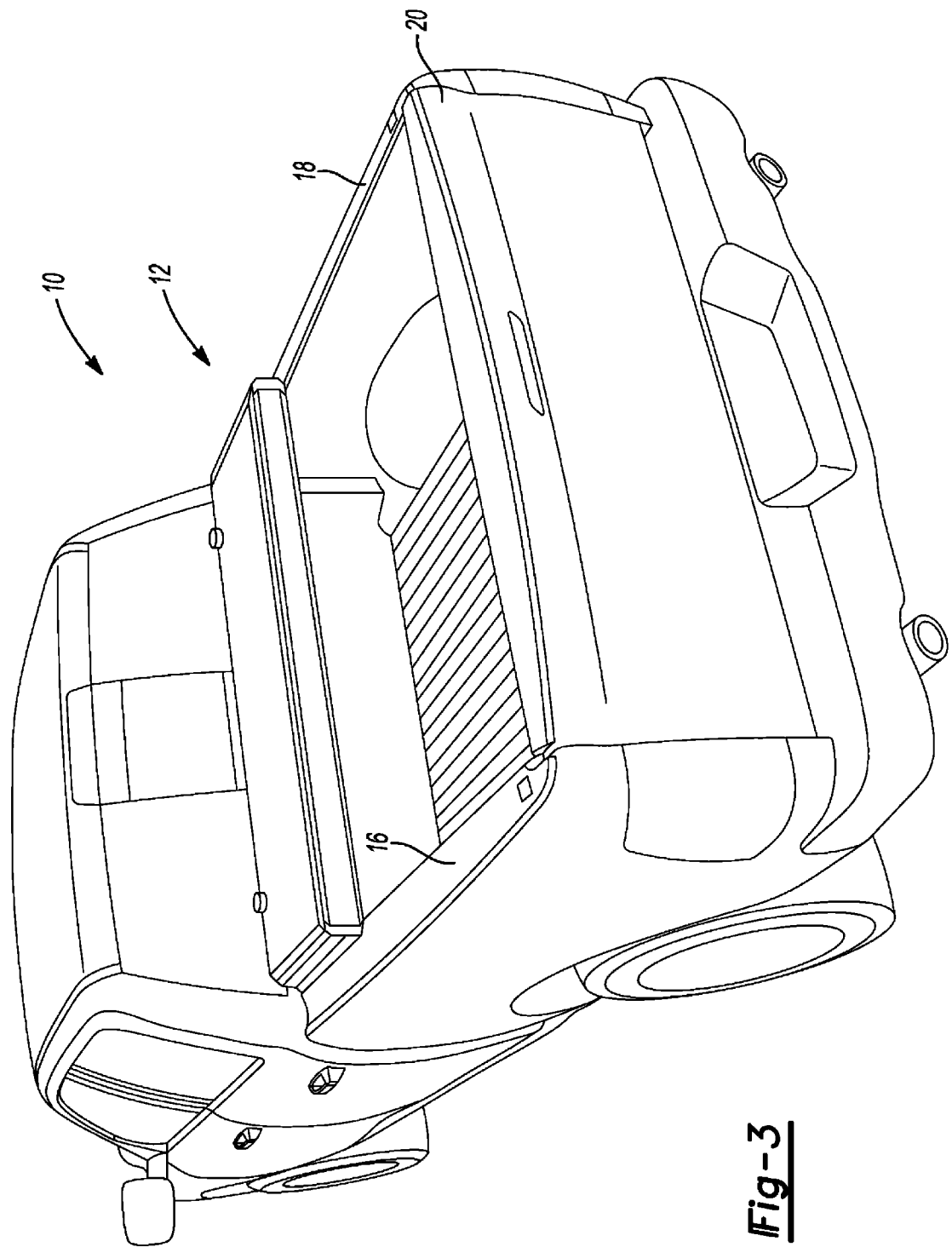
FIG. 3 is a perspective view illustrating a pickup truck having a tonneau cover system in a folded position according to the principles of the present disclosure.

With reference to FIGS. 1-3, a pickup truck 10 is shown having a tonneau system 12 which is attached to a cargo box 13 according to the present disclosure. Cargo box 13 has a front wall 14, a left sidewall 16, a right sidewall 18, and a rear wall or tailgate 20. In some embodiments, tonneau system 12 includes a central core portion 26 having a cover 22 disposed thereover and substantially rigid edge members 24 extending about at least a portion of core portion 26 and cover 22 to form a rectangular frame or panel section 28. Each panel section 28 can be pivotally coupled to an adjacent panel section 28 and sized to cover cargo box 13, as will be discussed herein. The tonneau system 12 can be connectable to cargo box 13 of the pickup truck 10. It should be appreciated that in some embodiments tonneau system 12 does not require central core portion 26.

Unlike conventional designs, tonneau system 12 of the present teachings does not employ separately required frames, brackets or additional members to be first coupled to walls 14, 16, 18, 20 of cargo box 13. Rather, tonneau system 12 of the present teachings, in some embodiments, generally employs a self-aligning feature for aligning panel sections 28 relative to sidewalls 16 and 18 of cargo box 13 (and/or front wall 14 and tailgate 20) and uses locking mechanisms incorporated into the structure of tonneau system 12 thereby effecting a reliable connection between tonneau system 12 and cargo box 13 in a single removable assembly.

Figure 4:
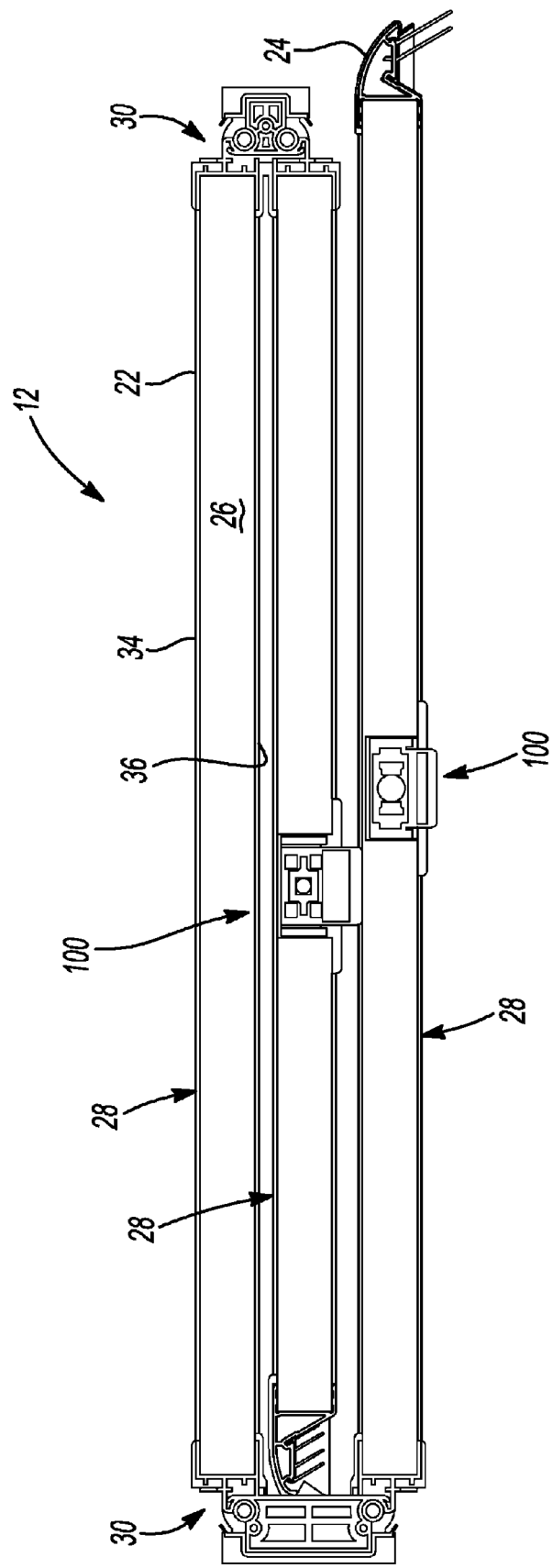
FIG. 4 is a side view illustrating the tonneau system according to the present teachings.
Figure 5:
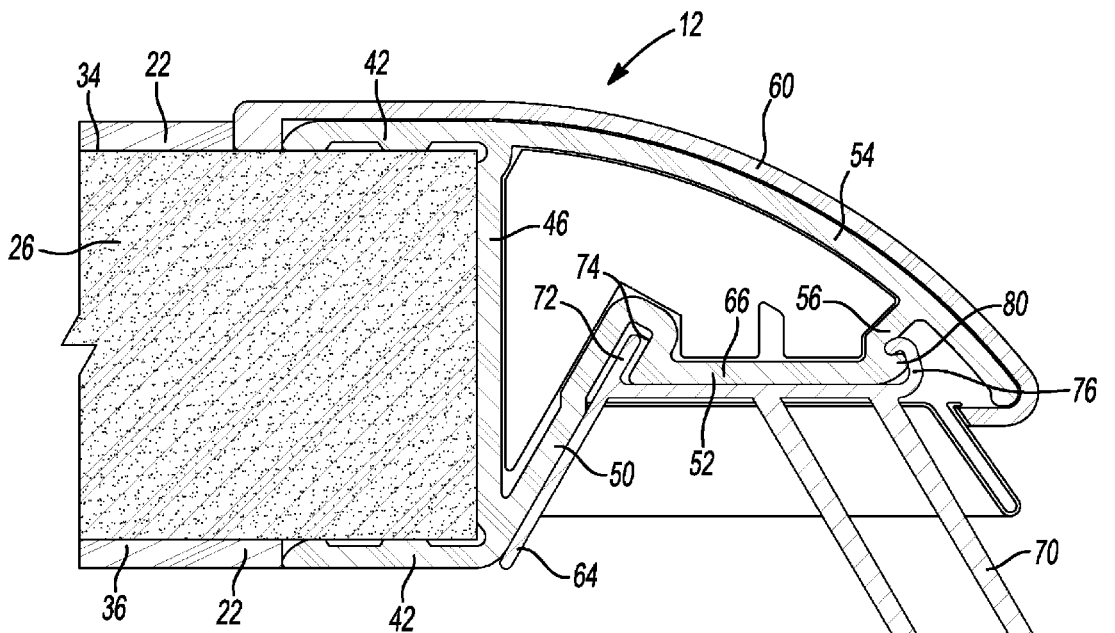
FIG. 5 is an enlarged cross-sectional view illustrating the tonneau system near the front edge member.

With particular reference to FIG. 4, tonneau system 12 is shown in a folded or collapsed position. In some embodiments, tonneau system 12 can comprise a plurality of panel sections 28, each pivotally coupled to an adjacent panel section 28 via a hinge assembly 30. As will be described, hinge assembly 30 is operable to permit adjacent panel sections 28 to articulate relative to each other between a folded position (FIG. 4) and an extended position (FIG. 1). That is, hinge assembly 30 permits adjacent panel sections 28 to articulate between a stacked configuration where panel sections 28 are each vertically stacked on top of each other to form a reduced footprint and an extended position where panel sections 28 are folded out relative to each other to form a generally planer cover assembly substantially extending cross vehicle and length wise over cargo box 13.

In some embodiments, panel section 28 can comprise central core portion, or in some embodiments a foam core, 26 having an first surface 34 and a second surface 36. Panel section 28 can further comprise a protective covering 22 extending along first surface 34 and/or second surface 36 of central core portion 26. As will be discussed in greater detail herein, protective covering 22 can be made of any one of a number of materials selected for its protective nature, structural integrity, UV resistance, corrosion resistance, self-healing properties, and the like. By way of non-limiting example, protective covering 22 can comprise an aluminum skin, a poly skin, a thermal plastic material, a thermoset material, a fiberglass reinforced plastic, or the like. Protective covering 22 and central core portion 26 can be joined to form a sandwiched assembly having a robust structural integrity and corrosion resistance.

In some embodiments, as illustrated in FIGS. 4-8, central core portion 26 and protective coverings 22 can be encapsulated along its exposed edges using a series of edge members 24. It should be appreciated from the illustrations that edge members 24 may comprise any one of a number of cross-sectional profiles. Moreover, it should be appreciated that unless otherwise described or claimed, edge members 24 should not be interpreted to be limited to only the specific cross-sectional profile illustrated herein. Notwithstanding, edge members 24, in some embodiments, can comprise features that are both new and novel in the art. With particular reference to FIGS. 4-7, edge member 24 is illustrated having a pair of capture arms 42 generally parallel to each other and sized to capture and/or engage central core portion 26 to at least in part join edge member 24 and central core portion 26. In some embodiments, capture arms 42 can comprise a series of gripping portions extending inwardly from capture arms 42 to engage first surface 34 and second surface 36 of central core portion 26. Edge member 24 can further comprise an abutment wall 46 disposed between capture arms 42 and orthogonal therewith. Abutment wall 46 can abut a vertical face 48 of central core portion 26. In some embodiments, edge member 24 can further comprise a cam surface 50 extending upwardly and outwardly from a lower section of abutment wall 46 and lower gripping portion 44. Cam surface 50 can be inclined at a predetermined angle along each of the edge members 24 to collectively form an inclined surface generally engageable with front wall 14, left side wall 16, right side wall 18, and tailgate 20 of cargo box 13. It should be appreciated, however, that cam surface 50 can define any cam shape that is conducive to achieve this self-centering function, such as an arcuate or radiused surface, combined with other optional surfaces or shapes. In this way, cam surface 50 and the weight of tonneau system 12 can cause tonneau system 12 to self-align within the dimensions of cargo box 13 during installation of tonneau system 12. That is, as tonneau system 12 is installed in cargo box 13, cam surface 50 of edge members 24 will engage an upper corner of front wall 14, left side wall 16, right side wall 18, and tailgate 20 and permit tonneau system 12 to slide into an alignment position where forces acting on tonneau system 12 generally reach an equilibrium along its perimeter.

Still referring to FIGS. 4-7, edge members 24 can further comprise a support wall 52 that is generally parallel with central core portion 26 and gripping portions 44. Support wall 52 is sized to generally engage a top surface of front wall 14, left side wall 16, and right side wall 18 to transfer the loading forces of tonneau system 12 to cargo box 13. Finally, edge members 24 can comprise a top wall 54 extending from upper capture arm 42 generally down to support wall 52. In some embodiments, edge member 24 can comprise an intermediate wall 56 interconnecting top wall 54 to support wall 52. It should be appreciated that top wall 54 can define any one of a plurality of cross-sectional shapes complementary to the styling of tonneau system 12, pickup truck 10, and/or conducive to environmental sealing.

Figure 7:
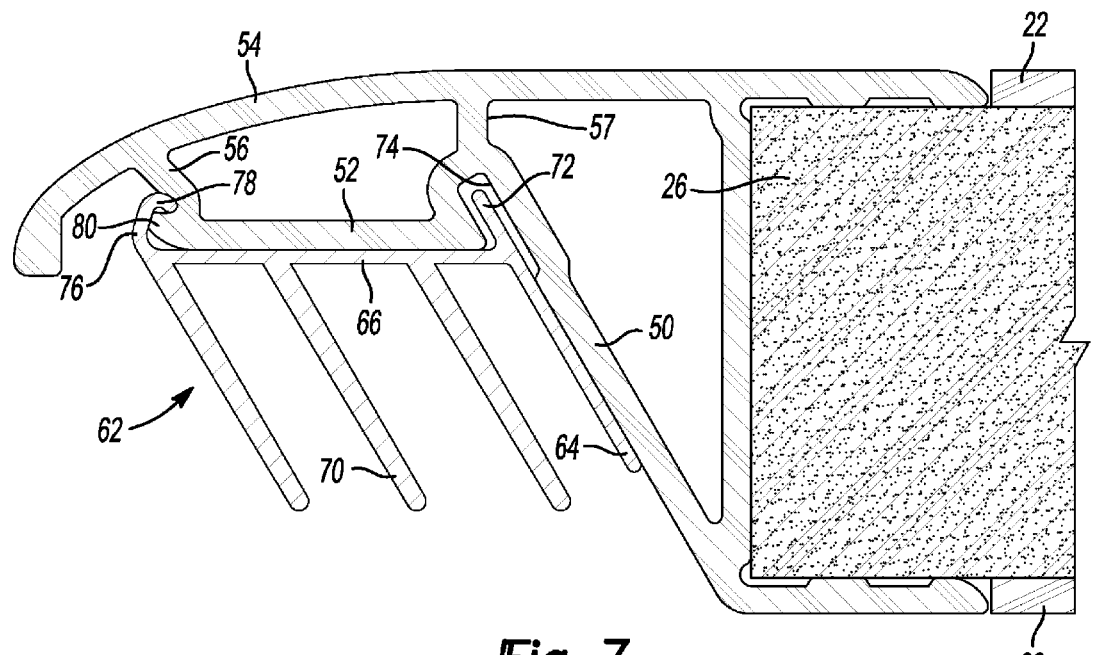
FIG. 7 is an enlarged cross-sectional view illustrating the tonneau system near the rear edge member.

With particular reference to FIG. 7, it should be appreciated that edge members 24 can further comprise internal support members 57 generally extending between cam surface 50 and top wall 54 for added structural integrity. Still further, with particular reference to FIG. 5, it should be appreciated that in some embodiments a protective cover 60 can be disposed over the top of top wall 54 for improved aesthetic appearance and/or protection from wear.

Figure 6:
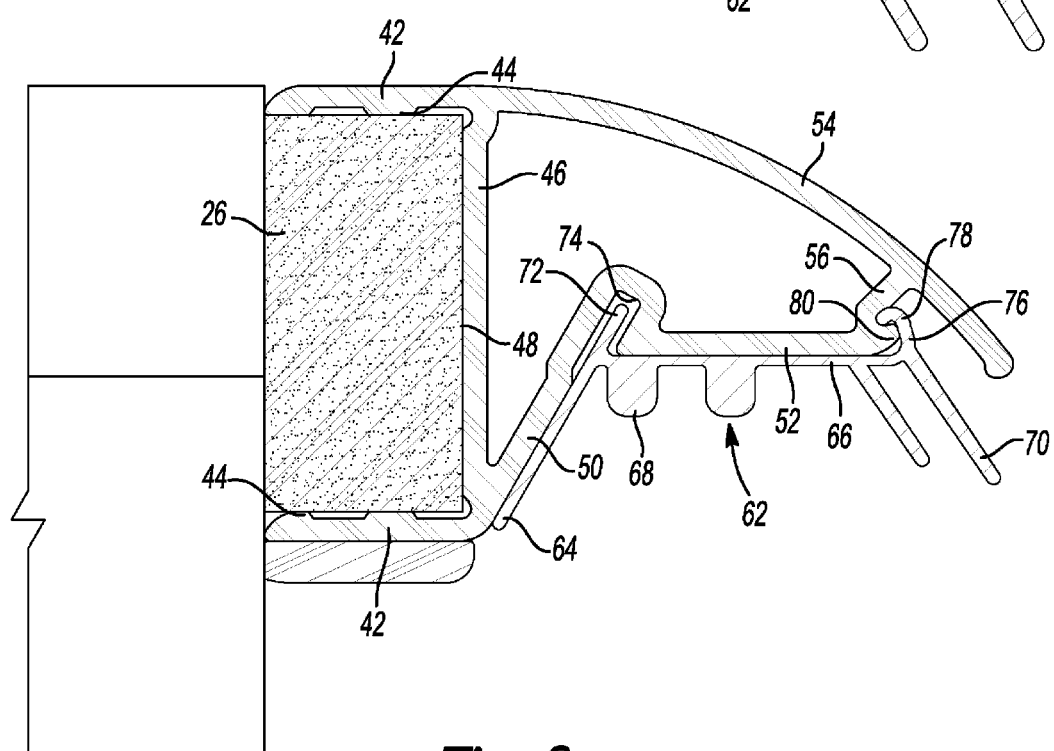
FIG. 6 is an enlarged cross-sectional view illustrating the tonneau system near the side edge member.

With reference to FIG. 6, it should be appreciated that the arrangement of edge members 24 provides a number of advantages over conventional tonneau systems. Specifically, tonneau system 12 of the present teachings is able to combine the benefits of an enlarged central core portion 26 with a reduced profile height viewable from outside the vehicle. Specifically, according to the principles of the present teachings, central core portion 26 can be a one inch thick foam core. One inch thick foam cores have been found to provide increased structural integrity and improve the performance of the tonneau system and its ability to resist aerodynamic forces and the placement of heavy objects on top of the panel sections. Unfortunately, in conventional designs, such one inch thick foam cores lead to an increased overall height of the tonneau system and panel sections above the side walls of the pickup truck. This increased height is not desired by consumers and leads to a bulky appearance. However, according to the principles of the present teachings, the cam surface 50 and raised support wall 52 of edge members 24 permits panel section 28 of tonneau system 12 to be received at least partially within cargo box 13 of pickup truck 10. Specifically, when tonneau system 12 is installed in cargo box 13 of pickup truck 10, a lower portion of panel section 28, namely a lower section of central core portion 26, is received within a volume of cargo box 13 defined by a plane extending from a top surface of left side wall 16 to a top surface of right side wall 18. In this way, the benefits of a one inch central core portion 26 can be combined with a low profile tonneau system 12. Still further, cam surface 50 of edge members 24 further permit the simplified installation of tonneau system 12 on pickup truck 10 without the need for additional side rails or mounting hardware.

With reference to FIGS. 4-7, tonneau system 12 can further comprise an integrated snap-on seal 62. In some embodiments, snap-on seal 62 can comprise a cam strip 64 generally covering cam surface 50 of edge member 24. Snap-on seal 62 can further comprise a support strip 66 joined with cam strip 64. Support strip 66 can generally extend along and cover support wall 52 of edge member 24. In some embodiments, support strip 66 can comprise one or more ribs extending downwardly from support strip 66 and engaging a top surface of cargo box 13, such as a top surface of left side wall 16 and right side wall 18. Rib 68 can be formed with a solid rubber-like material capable of withstanding the loading forces of tonneau system 12 on cargo box 13. In some embodiments, snap-on seal 62 can further comprise one or more flexible legs 70 operable to engage a top surface of cargo box 13 and deflect in response thereto to form a sealing engagement between edge members 24 and cargo box 13 to prevent moisture or other environmental contaminants from penetrating between tonneau system 12 and cargo box 13. Snap-on seal 62 can be retained to edge members 24 using a snap-on engagement. To this end, snap-on seal 62 can further comprise a guide leg 72 extending from and generally co-planer with cam strip 64. Guide leg 72 can be received within a guide slot 74 formed in edge member 24 between cam surface 50 and support wall 52. Snap-on seal 62 can further comprise a hooked leg 76 having an upturned portion 78 sized to engage a complementary hook member 80 formed between support wall 52 and intermediate wall 56 of edge member 24. In this way, the inclined arrangement of guide leg 72 being received within inclined guide slot 74 and the cooperating engagement of hooked leg 76 with complementary hooked portion 80 together forms a snap-on arrangement operable to retain snap-on seal 62 on edge member 24 and in proper position for installation of tonneau system 12 with cargo box 13 of pickup truck 10. As should be appreciated, snap-on seal 62 provides a protective barrier between tonneau system 12 and cargo box 13. Specifically, snap-on seal 62 prevents intimate contact between edge members 24 and cargo box 13 to prevent paint damage or other wear concerns. Snap-on seal 62 can, in some embodiments, be formed of a rubber material, a rubber-like material, a thermal plastic, a combination thereof, or other materials commonly used in the art. It should be appreciated that snap-on seal 62 can have any one of a plurality of configurations such as elongated flexible leg 70 (see FIG. 5), a plurality of flexible legs 70 being oriented generally parallel to cam strip 64 (FIG. 7) to permit proper sealing between edge member 24 and tailgate 20.

It should be understood that snap-on seal 62 can extend around the entire periphery of tonneau system 12, thereby providing sealing engagement thereabout. Moreover, it should be understood that snap-on seal 62 does not require the use of adhesives and, thus, can provide a more reliable connection to tonneau system 12 without the mess and unreliability of adhesives.

Figure 9:
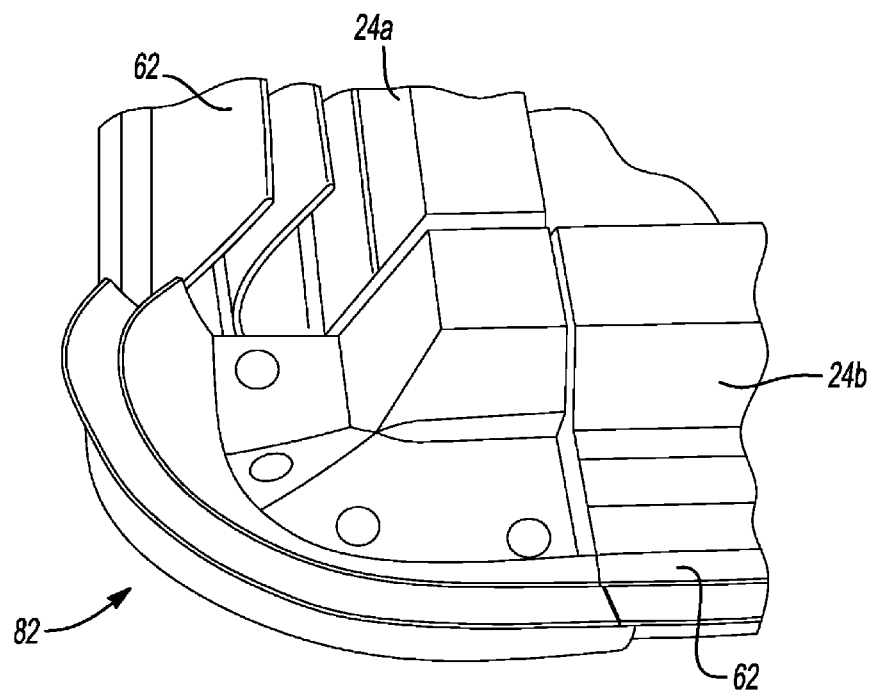
FIG. 9 is a lower perspective view illustrating the integrated corner member and seal.

With reference to FIG. 9, in some embodiments, tonneau system 12 can comprise an integrated corner member and seal 82 disposed between and connected to rear edge member 24A and side edge member 24B. For purposes of discussion, rear edge member 24A is merely edge member 24 configured and shaped for use in conjunction with tailgate 20 of pickup truck 10. Rear edge member 24A includes a corresponding snap-on seal 62 having a seal profile as described herein complementary to tailgate 20. Similarly, side edge member 24B is merely edge member 24 configured and shaped for use with left side wall 16 or right side wall 18 of pickup truck 10. Side edge member 24B comprises a snap-on seal 62 configured and sized to complement left side wall 16 or right side wall 18. Integrated corner member and seal 82 can be fixedly coupled to rear edge member 24A and side edge member 24B using conventional techniques and can define a transition seal profile sweeping along integrated corner member 82 to sealingly engage a corner between side wall 16, 18 and tailgate 20. Similarly, integrated corner member and seal 82 can be used at each corner of tonneau system 12 to provide sealing engagement between tonneau system 12 and cargo box 13. It should be noted that integrated corner member and seal 82 can be formed as a single integral member having connection means and sealing means formed in a single unitary member for improved aesthetic qualities, reduced number of parts, and reduced manufacturing costs. Unlike conventional designs, the integrated corner member in seal 82 does not require the use of messy and unreliable adhesives and, thus, provides a simple and reliable design.

Figure 8:
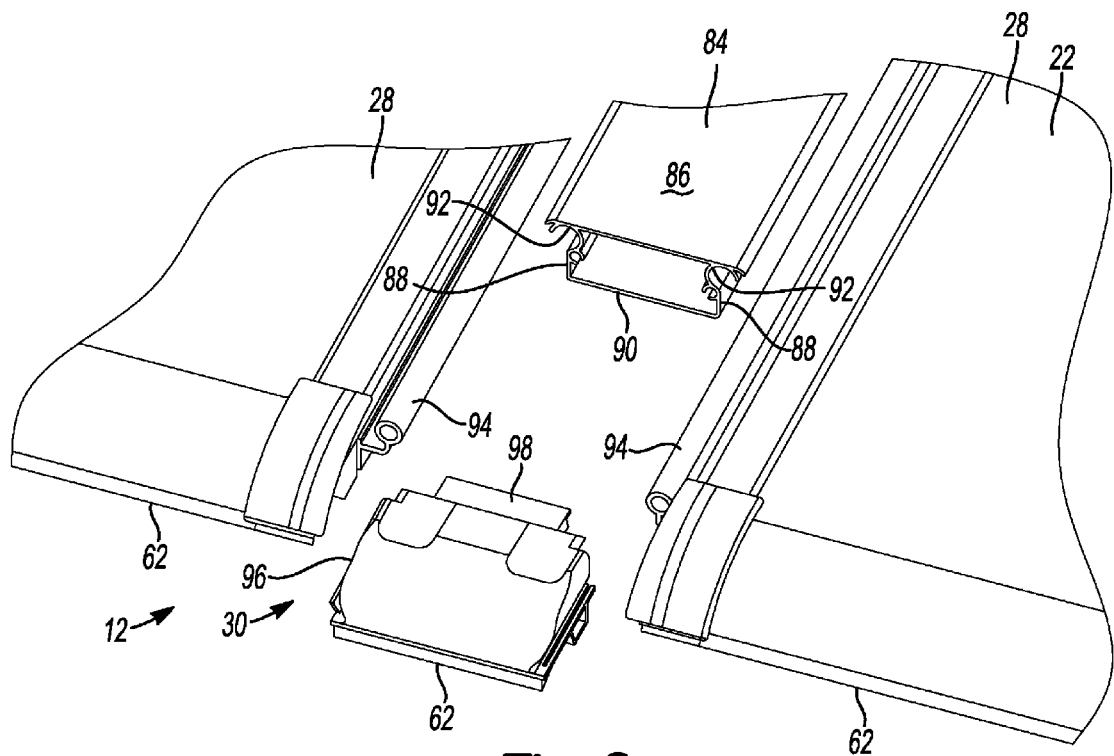
FIG. 8 is an exploded perspective view illustrating the hinge assembly.

As seen in FIG. 8, tonneau system 12 can further comprise hinge assembly 30 having a central hinge beam 84 generally defining a rectangular cross-section whereby a top portion 86 spans between adjacent panel sections 28 to form a generally planer continuous surface along the top of tonneau system 12. In some embodiments, a pair of downwardly extending portions 88 extend from top portion 86 and are joined along a bottom edge by bottom portion 90. Therefore, top portion 86, downwardly extending portions 88, and bottom portion 90 collectively form the aforementioned rectangular cross-section. In some embodiments, downwardly extending portions 88 include a generally circular slot 92 sized to receive a corresponding circular member 94 extending from edge members 24 on adjacent panel sections 28. Circular member 94 and circular slot 92 are formed to permit at least about 90 degrees of rotation between central hinge beam 84 and panel section 28. In some embodiments, hinge assembly 30 further comprises an end cap 96 having a projecting portion 98 sized to be received within a cavity of central hinge beam 84—namely, a cavity bound by a top portion 86, downwardly extending portions 88, and bottom portion 90. In some embodiments, end cap 96 further comprises snap-on seal 62 for engagement with left side wall 16 or right side wall 18 of cargo box 13. In some embodiments, end cap 96 can comprise a seal 62 that is integrally formed or molded with end cap 96, thereby eliminating the need for a snapping configuration.

Figure 10:
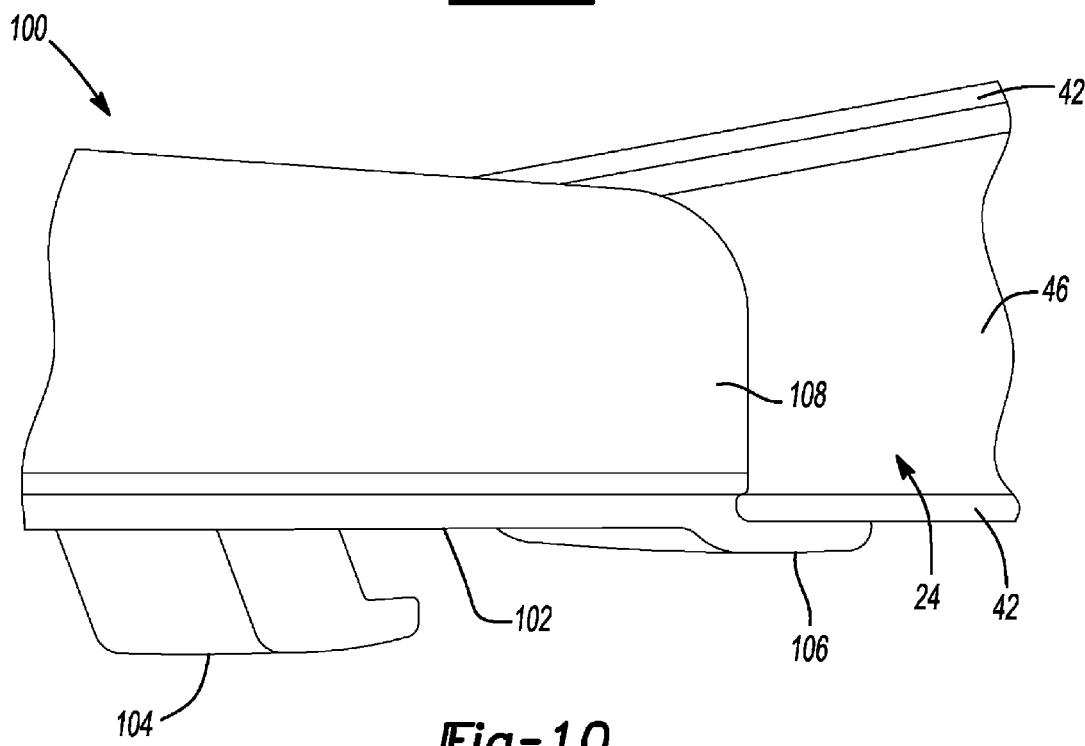
FIG. 10 is a perspective view illustrating the locking mechanism.
Figure 11:
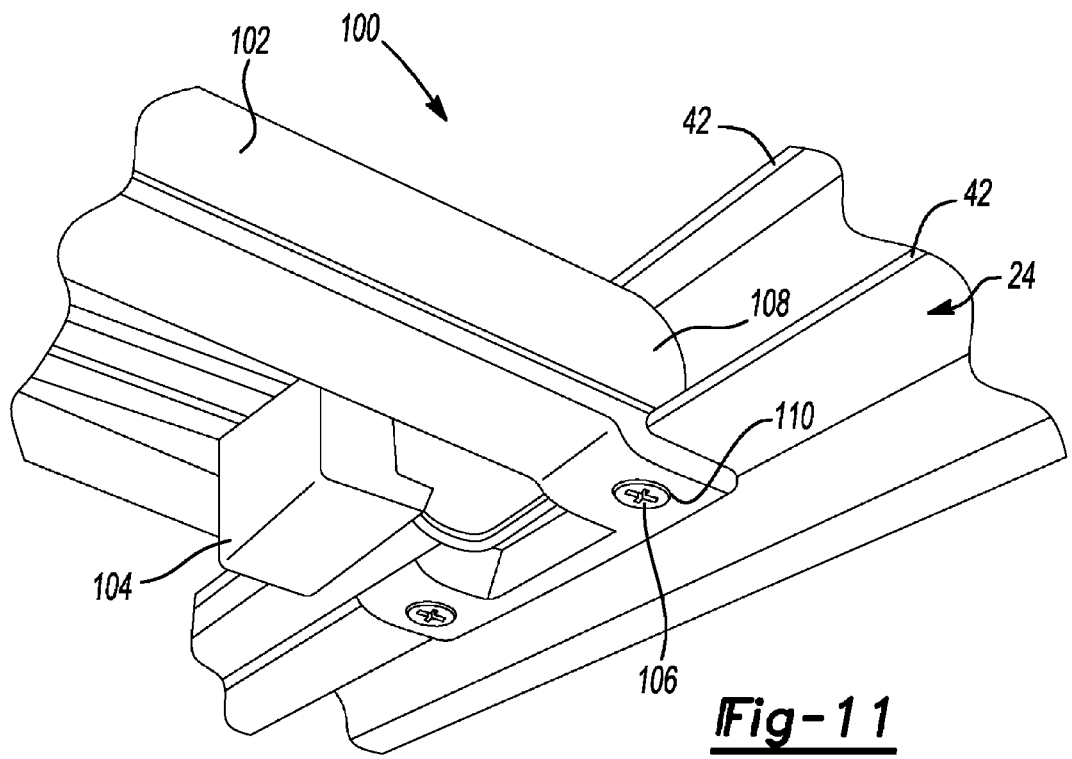
FIG. 11 is a lower perspective view illustrating the locking mechanism with portions removed for clarity.

Turning now to FIGS. 10 and 11, in some embodiments tonneau system 12 can comprise a clamp pocket integral with edge members 24. Specifically, tonneau system 12 can comprise a locking mechanism 100 (see FIGS. 2, 4, 10 and 11) for lockingly engaging tonneau system 12 with cargo box 13. Locking mechanism 100 can comprise a clamp pocket 102 defining an enclosure for receiving a locking arm 104 and associated componentry. Locking arm 104 can be slidably coupled to clamp pocket 102 along an axis that permits locking arm 104 to move into a locking engagement with left side wall 16 or right side wall 18 of cargo box 13. Locking arm 104 can be specifically coupled to clamp pocket 102 for transferring retaining loads to clamp pocket 102. Moreover, in some embodiments, clamp pocket 102 comprises a retaining lip 106 that extends below a portion of capture arm 42 of edge member 24. Clamp pocket 102 can further comprise an enlarged body portion 108 that is sized to be received between capture arms 42 of edge members 24. Fasteners 110 can be used to fixedly couple clamp pocket 102 to capture arm 42 of edge member 24. In this regard, clamping forces exerted upon locking arm 104 can be transferred to clamp pocket 102 and further transferred directly and intimately to edge members 24. Unlike conventional designs that may transfer loading forces through an associated foam core or additional retaining structure, the present teachings provide a simple and efficient method of reliably transferring loading forces between locking arm 104 and edge members 24 to prevent unnecessary damage and load carrying requirements within panel section 28 and/or central core portion 26. Accordingly, the present teachings minimize the need for additional clamping hardware and reinforcing componentry to provide a simplified and reliable retaining structure.

Figure 12:
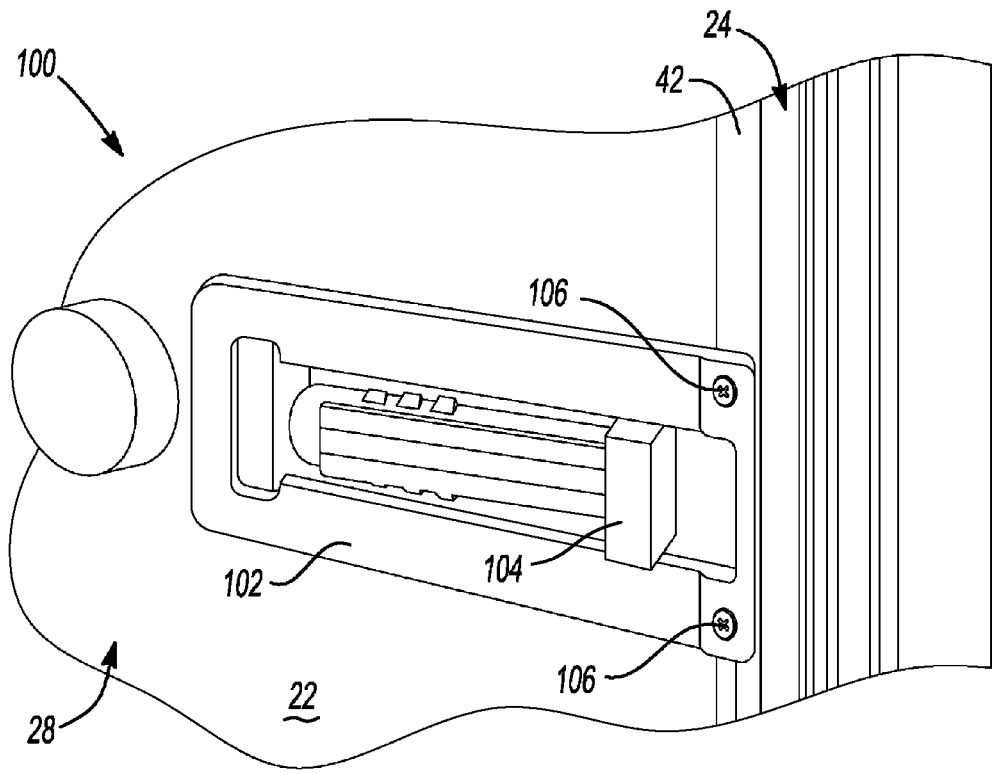
FIG. 12 is a perspective view illustrating the locking mechanism.

As seen in FIG. 12, locking arm 104 can be received within clamp pocket 102 during storage to minimize space requirements and to help prevent damage to adjacent panels of tonneau system 12 when panel sections 28 are placed in their folded position (FIG. 4).

According to the principles of the present teachings, central core portion 26 can comprise a one inch EPS foam (Styrofoam) covered with protective covering 22 being made of a fiberglass reinforced plastic. In some embodiments, protective covering 22 can further comprise pigments that reflect light thereby reducing the surface temperature of the protective covering and the associated foam core. Moreover, protective covering 22 can include UV protection that further helps to reduce the surface temperature of the protective covering and foam core.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A tonneau system for a cargo box of a vehicle, the tonneau system comprising:
at least one panel section having opposing edge members carried therewith, said edge members each having a cam surface extending upwardly and outwardly from a lower portion of said edge member to form an inclined face, said inclined faces engageable with opposing sides of the cargo box of the vehicle to generally self-center said at least one panel section between the opposing sides of the cargo box.

2. The tonneau system according to claim 1 wherein said opposing edge members further comprise a lower portion disposed below a top plane of the cargo box.

3. The tonneau system according to claim 1, further comprising:
a seal member snappingly connectable to at least one of said opposing edge members.

4. The tonneau system according to claim 3 wherein said seal member comprises:
a guide leg received within a corresponding slot formed in said at least one of said opposing edge members; and
a hooked leg snappingly engaging a corresponding feature formed in said at least one of said opposing edge members.

5. The tonneau system according to claim 3 wherein said seal member comprises:
a cam strip generally extending along said cam surface of said at least one of said opposing edge members, said cam strip providing a barrier between said inclined face and the cargo box.

6. The tonneau system according to claim 1 wherein said opposing edge members each comprises a support wall for engaging the cargo box, said support wall being disposed at a position higher than a lowermost portion of said at least one panel section such that at least a portion of said at least one panel section is received within a volume of the cargo box.

7. The tonneau system according to claim 1, further comprising:
a seal member extending about the periphery of said panel section.

8. A tonneau system for a cargo box of a vehicle, the tonneau system comprising:
a plurality of panel sections each having opposing edge members extending therefrom, said edge members each having a cam surface extending upwardly and outwardly from a lower portion of said edge member to form an inclined face, said inclined faces engageable with opposing sides of the cargo box of the vehicle to generally self-center said panel section between the opposing sides of the cargo box, each of said plurality of panel sections being pivotally coupled to an adjacent one of said plurality of panel sections to permit said plurality of panel sections to be configured between a stacked position and an extended position generally covering the cargo box of the vehicle.

9. The tonneau system according to claim 8, further comprising:
a seal member extending about the periphery of said plurality of panel sections and engageable with the cargo box.

10. The tonneau system according to claim 8 wherein said opposing edge members further comprise a lower portion disposed below a plane extending along a top of the cargo box.

11. The tonneau system according to claim 8, further comprising:
a seal member snappingly connectable to at least one of said opposing edge members.

12. The tonneau system according to claim 11 wherein said seal member comprises:
a guide leg received within a corresponding slot formed in said at least one of said opposing edge members; and
a hooked leg snappingly engaging a corresponding feature formed in said at least one of said opposing edge members.

13. The tonneau system according to claim 11 wherein said seal member comprises:
a cam strip generally extending along said inclined face of said at least one of said opposing edge members, said cam strip providing a barrier between said inclined face and the cargo box.

14. The tonneau system according to claim 8 wherein said opposing edge members each comprises a support wall for engaging the cargo box, said support wall being disposed at a position higher than a lowermost portion of a corresponding one of said plurality of panel sections such that at least a portion of said corresponding one of said plurality of panel sections is received within a volume of the cargo box.

15. The tonneau system according to claim 8, further comprising:
a corner member fixedly coupled to at least one of said plurality of panel sections, said corner member having an integrally formed seal member engageable with the cargo box.

16. The tonneau system according to claim 8, further comprising:
a hinge assembly operably coupled between at least two of said plurality of panel sections, said hinge assembly having a seal member engageable with the cargo box.

17. The tonneau system according to claim 16 wherein said hinge assembly comprises an end cap and said seal member is integrally formed with said end cap.

18. The tonneau system according to claim 8, further comprising:
a cover portion extending over at least one of said plurality of panel sections, said cover portion being made of a fiberglass reinforced plastic.

19. The tonneau system according to claim 18, further comprising a central foam core portion, said cover covering said central foam core portion.

20. A tonneau system for a cargo box of a vehicle, the tonneau system comprising:
a plurality of panel sections each having an edge member extending therefrom engageable with the cargo box for supporting said plurality of panel sections such that a portion of each of said plurality of panel sections is received within a volume of the cargo box to achieve a lower exterior profile, each of said plurality of panel sections being pivotally coupled to an adjacent one of said plurality of panel sections to permit said plurality of panel sections to be configured between a stacked position and an extended position generally covering the cargo box of the vehicle,
wherein each of said edge members comprises a cam surface extending upwardly and outwardly from a lower portion of said edge member to form an inclined face, said inclined faces engageable with opposing sides of the cargo box of the vehicle to generally self-center said panel sections between the opposing sides of the cargo box.

* * * * *